United States Patent Office 3,422,125
Patented Jan. 14, 1969

3,422,125
ORGANOMETALLIC DERIVATIVES OF
ARSENIC AND ANTIMONY
Howard Bernard Silver, Hinchley Wood, Surrey, and Raymond Thompson, Esher, Surrey, England, assignors to United States Borax & Chemical Corporation, Los Angeles, Calif.
No Drawing. Filed Feb. 1, 1966, Ser. No. 523,977
Claims priority, application Great Britain, Feb. 11, 1965, 6,001/65
U.S. Cl. 260—414      13 Claims
Int. Cl. C11c 1/00; C09k 3/28

ABSTRACT OF THE DISCLOSURE

Organometallic compounds of the formula $M(ODX)_3$ where M is arsenic or antimony, D is a divalent metal such as cobalt, zinc, calcium, magnesium, lead or cadmium and X is a carboxylate radical. The compounds are especially useful as flame-proofing agents.

---

This invention relates to organic derivatives of arsenic and antimony and to methods for their preparation.

According to this invention, there are provided organometallic compounds of the formula $M(ODX)_3$ where M represents arsenic or antimony, D represents a divalent metal and X represents a carboxylic acid radical (carbonyl), it being understood that where a compound contains more than one metal or acid radical, these may be the same or different. The compounds are viscous to brittle solids, usually colored.

The compounds of this invention can be made by heating together a divalent metal salt of a carboxylic acid and an alkyl or aryl ester of arsenious, arsenic, antimonious or antimonic acid and removing at least part of the alcohol, phenol or ester that is liberated. The said alkyl or aryl ester of the acid of antimony and arsenic can be any of formulae: $M(OR)_3$, $O=M(OR)$, $M(OH)_n(OR)_{3-n}$, or $OM(OH)_n(OR)_{3-n}$ where M represents an atom of arsenic or antimony, R is an alkyl or aryl radical, especially of up to 20 carbon atoms, and preferably lower alkyl of 1 to 8 carbon atoms or phenyl, and $n$ is 1 or 2.

The divalent metal salts (which are conveniently metal soaps) may be salts of one or two carboxylic acids of up to, for example, 30 carbon atoms, saturated or unsaturated, and may be neutral or basic salts. The divalent metal represented by D can be, for example, cobalt, zinc, calcium, magnesium, lead or cadmium. At least one carboxylic radical preferably has from about 6 to about 20 carbon atoms. Examples of suitable metal salts include zinc tallate acetate, cobalt naphthenate acetate, cobalt versatate acetate, magnesium versatate acetate, lead versatate acetate, calcium versatate acetate and zinc versatate acetate. In accordance with accepted usage, the terms tallate, naphthenate, versatate and acetate are meant to refer to the carboxylate anions of tall oil fatty acids, naphthenic acid, versatic acid, and acetic acid, respectively. Versatic acid is a name given to the commercially available saturated, highly branched, principally tertiary carboxylic acids which are generally mixtures of $C_9$, $C_{10}$, and $C_{11}$ acids.

In the preparation of compounds of the invention, useful products may be obtained by distilling off only a part of the alcohol, phenol or ester liberated, the residue remaining in the product as a diluent, especially when the arsenic or antimony ester used is one that is not very volatile.

The process of the invention results in the formation of any of a variety of compounds depending upon the starting materials used. Generally, when the reaction is carried to completion, it can be illustrated by the following equation, in which X and $X_2$ are carboxylic acid radicals and D, M and R have the significance previously assigned:

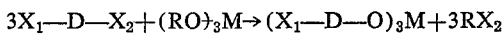

$$3X_1\text{—}D\text{—}X_2 + (RO)_3M \rightarrow (X_1\text{—}D\text{—}O)_3M + 3RX_2$$

However, side reactions can lead to formation of metal-oxygen-metal bonds and formation of some polymeric material. When a basic salt of a single acid is used, further carboxylic acids may be added to the reaction mixture.

Where the ester used is a trialkyl arsenine or trialkyl antimonite (for instance the tributyl esters) they can be prepared by known methods; for instance, tri-n-butyl arsenite by reaction of arsenious oxide and n-butanol, and tri-n-antimonite by reaction of antimony trichloride, n-butanol and triethylamine. It appears that, especially where the metal salt is a metal soap, the arsenite need not be isolated and that the desired product can be obtained by feeding a mixture of the arsenious oxide, n-butanol, divalent metal oxide and the appropriate carboxylic acid to the reaction zone.

The arsenic and antimony derivatives of the invention possess properties that make them useful as fungicides, insecticides, plasticizers, epoxy resin curing agents, fuel additives, corrosion inhibitors and paint driers.

The invention is illustrated by the following examples, but is not to be considered limited to the specific examples given.

EXAMPLE 1

Reaction between tri-n-butyl arsenite and zinc tallate acetate

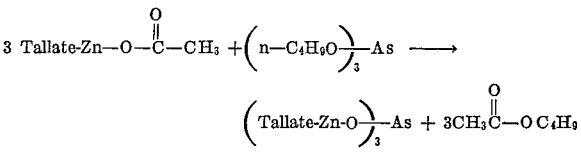

Zinc tallate acetate was first obtained as follows. A mixture of zinc oxide (4.07 grams; 0.05 mole) and tall oil fatty acid (15.0 grams; 0.05 mole) was placed in a three-necked 100 ml. flask equipped with a dropping funnel, water condenser and thermometer. The flask was heated to 60° C. with occasional shaking and, at this temperature, acetic acid (3.0 grams; 0.05 mole) was added. The flask was heated to 115° C. to obtain a homogeneous liquid product, and kept at this temperature for some two hours. The condenser was then removed, and the flask arranged for distillation. The reaction mixture was then heated to 154° C. to remove the water formed (1.1 grams), the last traces being removed by applying a slight vacuum.

The zinc tallate acetate product obtained by the above procedure was cooled to 130° C. and tri-n-butyl arsenite (4.9 grams; 0.0166 mole) added. The flask was heated to 194° C. for five hours, in which time n-butyl acetate (2.3 grams; 0.020 mole), B.P. 126° C. was removed and identified by VPC/IR techniques. The residue (23.35 grams) consisted of a light grey-brown grease, and a sample (16.95 grams) was removed and heated at 190° C. under high vacuum. In this way a further quantity (0.8 gram) of n-butyl acetate was removed, corresponding to a total of 3.1 grams; 0.029 mole; 58.6%. The residue, 16.1 grams of tris(zinc oxytallate)arsenite, had an unchanged appearance.

EXAMPLE 2

Reaction between tri-n-butyl arsenite and cobalt naphthenate acetate

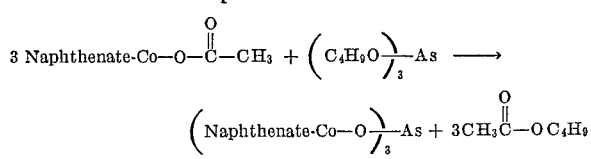

A mixture of cobalt hydrate (4.9 grams; 0.05 mole), naphthenic acid (11.7 grams; 0.05 mole) and toluene (20 ml.) was placed in a three-necked flask equipped with a dropping funnel, a Dean and Stark column, and a thermometer, and heated to 50° C., with occasional shaking. At this temperature acetic acid (3.0 grams; 0.05 mole) was added to the reaction mixture, which was then heated under reflux to remove water (1.6 grams; 0.090 mole) azeotropically. Heating was continued to remove toluene, the last traces of which were removed at reduced pressure.

The residual cobalt naphthenate acetate was heated to 150° C. and tri-n-butyl arsenite (4.9 grams; 0.0166 mole) was added. On heating the reaction mixture to 190° C., a liquid, B.P. 126° C. was obtained; continual heating to 190° C. for a further two hours gave little further distillate. Examination of this distillate by VPC/IR techniques, showed it to be n-butyl acetate (3.65 grams; 0.031 mole; 62%). The residue (19.15 grams) consisted of a purple tacky solid. A portion (17.35 grams) of this solid was heated at 190° C. at reduced pressure in a distillation apparatus in series with a cold trap (−196° C.). A distillate (1.95 grams), B.P. 92–120° C./0.01 mm. was obtained, whose infrared spectrum suggested it to be n-butyl naphthenate. The trap yielded more n-butyl acetate (0.95 gram) thus giving a total equivalent of 4.76 (0.041 mole; 82%). The residue (14.45 grams) consisted of a hard blue resinous solid. (Found: As, 7.5%.)

EXAMPLE 3

Reaction between tri-n-butyl antimonite and zinc tallate acetate

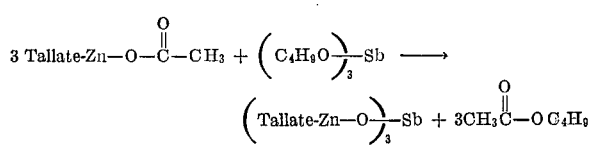

Zinc tallate acetate (0.05 mole) prepared in a 100 ml. flask by the procedure described in Example 1 above, was heated to 130° C. and tri-n-butyl antimonite (5.7 grams; 0.0167 mole) was added. The pot temperature was raised to 190° C., when a colorless liquid, B.P. 123° C. distilled off, and the residue became very dark green in color. After being kept at 190° C. for four hours, the flask was cooled to 40–50° C. and pumped. In this way n-butyl acetate (2.2 grams; 0.019 mole) was obtained, leaving a mobile opaque, dark green residue (24.4 grams).

A portion (20.15 grams) of this residue was heated at 190° C. at 0.1 mm. in series with a trap maintained at −196° C., yielding a further amount of n-butyl acetate (1.3 grams; equivalent to a total of 3.77 grams; 0.0325 mole; 65%). The residue (18.9 grams) was unchanged in appearance.

EXAMPLE 4

Reaction between tri-n-butyl antimonite and cobalt versatate acetate

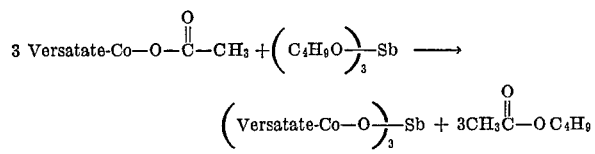

Cobalt hydrate (0.15 mole) versatic acid (0.15 mole) and toluene (60 ml.) were slurried in a three-necked flask (250 ml.) fitted with stirrer, dropping funnel and a Dean and Stark receiver. The temperature was raised to 60° C., acetic acid (0.15 mole) was added, the mixture was maintained at this temperature for 5 minutes and was then refluxed. An aqueous distillate (3.6 grams) was obtained, the excess distillate being attributed to codistilled acetic acid. After one hour, the toluene was distilled off at atmospheric pressure, the last traces being removed using high vacuum. The temperature was adjusted to 120° C. and tri-n-butyl antimonite (0.03 mole) added. The mixture was heated to initiate reaction and the temperature was maintained at 180° to 205° C. for two hours. During this period a clear, colorless liquid distilled over (14.4 grams; B.P. 118°–130° C.) identified as n-butyl acetate by infrared spectroscopy (82.5% of theory).

The residue was then heated at 200° C./0.1 mm. Hg, whereby a further distillate (1.54 grams) identified as n-butyl versatate was obtained.

The final residue (44.8 grams) was a deep blue solid, which can be named tris(cobalt oxyversatate)antimonite.

EXAMPLE 5

Reaction between tri-n-butyl antimonite and magnesium versatate acetate

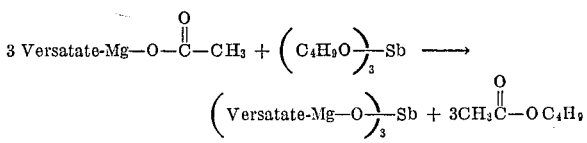

Magnesium versatate acetate was prepared from light magnesium carbonate (0.2 equivalent), versatic acid (0.1 mole) and acetic acid (0.1 mole) by a procedure analogous to that described above. The residue, after elimination of solvent, was heated to 130° C. and the tri-n-butyl antimonite (0.033 mole) was added. The temperature was raised and maintained at 180° C. for two hours during which time n-butyl acetate (8.65 grams) distilled over. The residue was then heated at 180°–190° C./0.05 mm. Hg affording as distillate n-butyl versatate (0.8 grams). The final residue (23.9 grams) was a light brown solid, tris(magnesium oxyversatate)antimonite.

EXAMPLE 6

Reaction of tri-n-butyl antimonite and lead versatate acetate

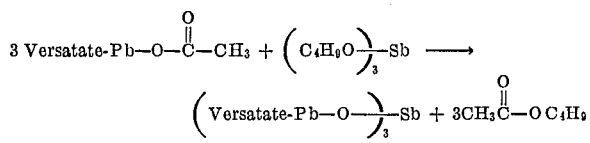

The lead versatate acetate was prepared as above from lead oxide (litharge) (0.1 mole), versatic acid (0.1 mole) and acetic acid (0.1 mole). The product was then heated to 125° C. and the tri-n-butyl antimonite (0.33 mole) was added. The temperature was increased to 165°–185° C. for one hour giving a distillate of n-butyl acetate (10.3 grams; 90% theory). Further heating of the resultant solid at 170°–180° C./0.02 mm. Hg gave n-butyl versatate (0.72 gram).

The final product was a light brown, waxy solid, which can be named tris(lead oxyversatate)antimonite.

EXAMPLE 7

Reaction between tri-n-butyl antimonite and calcium versatate acetate

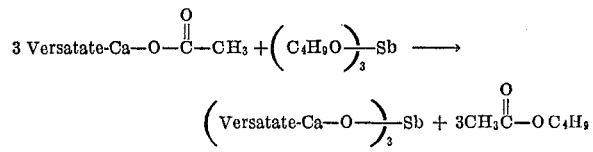

The calcium versatate acetate was prepared as described above for the cobalt and magnesium analogoues, from calcium oxide (0.15 mole), versatic acid (0.15 mole) and acetic acid (0.15 mole). The product thus obtained after elimination of the solvent was a sticky, white solid. This was heated to 80° C. and tri-n-butyl antimonite (0.05 mole) added; the temperature was raised to 140° C. and maintained at this level for five hours. n-Butyl acetate (7.6 grams) distilled over during this period. The residue was then heated at 180° C./2 mm. Hg giving n-butyl versatate (2.85 grams).

The final residue (37 grams) was a grey brittle solid, which can be named tris(calcium oxyversatate)antimonite.

EXAMPLE 8

Reaction of tri-n-butyl antimonite with zinc versatate acetate

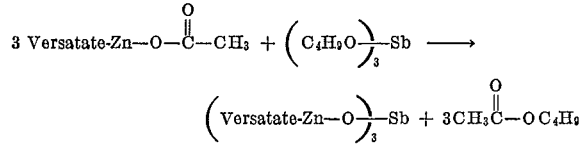

Zinc versatate acetate, prepared by the methods described above for the analogous metal salts, from zinc oxide (0.1 mole), versatic acid (0.1 mole) and acetic acid (0.1 mole) was heated to 130° C. and tri-n-butyl antimonite (0.03 mole) was added. The temperature was slowly raised to 180° C. and maintained at this level for two hours. n-Butyl acetate (9.27 grams) was distilled off. Application of 0.4 mm. Hg afforded a final distillate of n-butyl acetate (0.15 gram; total 9.24 grams; 81.2% theory). No n-butyl versatate was obtained.

The final product was a viscous brown solid, (29.8 grams), which can be named tris(zinc oxyversatate)antimonite.

The tri-n-butyl arsenite used in the examples was prepared by the reaction of arsenious oxide and n-butanol, with the elimination of water; and the tri-n-butyl antimonite was prepared by the reaction of antimony trichloride, n-butanol and triethylamine.

The arsenic and antimony derivatives of this invention can be used as flame-proofing agents, and where they are to be used for flame-proofing polymeric compositions it is desirable that they should be bonded to the polymer. A convenient way of doing this is for the said derivatives to have functional groups by means of which they can be so bonded. Accordingly, the arsenic or antimony esters used in preparing the substances of the invention can have an unsaturated aliphatic radical, as for example acrylyl.

Similarly the carboxylic radicals of the metal salt can have substituents (for instance amino and nitro) by means of which bonding to a polymer substrate can be achieved.

Various changes and modifications of the invention can be made and, to the extent that such variations incorporate the spirit of this invention, they are intended to be included within the scope of the appended claims.

What is claimed is:

1. Compounds of the formula $$M(ODX)_3$$

where M is selected from the group consisting of arsenic and antimony, D is a divalent metal selected from the group consisting of cobalt, zinc, calcium, magnesium, lead and cadmium, and X is a tallate, naphthenate or versatate radical.

2. Compounds according to claim 1 in which said M is antimony.
3. Compounds according to claim 1 in which said X is a tallate group.
4. Compounds according to claim 1 in which said X is a naphthenate group.
5. Compounds according to claim 1 in which said X is a versatate group.
6. Tris(zinc oxytallate)arsenite.
7. Tris(cobalt oxynaphthenate)arsenite.
8. Tris(zinc oxytallate)antimonite.
9. Tris(cobalt oxyversatate)antimonite.
10. Tris(magnesium oxyversatate)antimonite.
11. Tris(lead oxyversatate)antimonite.
12. Tris(calcium oxyversatate)antimonite.
13. Tris(zinc oxyversatate)antimonite.

References Cited

UNITED STATES PATENTS

| 2,773,083 | 12/1956 | Schmidt et al. | 260—439 |
| 2,839,554 | 6/1958 | Haslam | 260—446 |
| 3,061,647 | 10/1962 | Jenkner | 260—606.5 |
| 3,103,526 | 9/1963 | Jenkner | 260—431 |

FOREIGN PATENTS 628,730  8/1963  Belgium.

ALEX MAZEL, Primary Examiner.
R. V. RUSH, Assistant Examiner.

U.S. Cl. X.R.

260—429.9, 435, 439, 441, 446